United States Patent
Soika et al.

(10) Patent No.: US 8,670,808 B2
(45) Date of Patent: Mar. 11, 2014

(54) SYSTEM HAVING AT LEAST ONE SUPERCONDUCTING CABLE

(75) Inventors: Rainer Soika, Hannover (DE); Mark Stemmle, Hannover (DE)

(73) Assignee: NEXANS, Paris (FR)

( * ) Notice: Subject to any disclaimer, the term of this patent is extended or adjusted under 35 U.S.C. 154(b) by 585 days.

(21) Appl. No.: 12/915,532

(22) Filed: Oct. 29, 2010

(65) Prior Publication Data

US 2011/0105335 A1 May 5, 2011

(30) Foreign Application Priority Data

Oct. 30, 2009 (EP) .................................. 09306039

(51) Int. Cl.
*H01B 12/00* (2006.01)
*H01L 39/24* (2006.01)

(52) U.S. Cl.
USPC .......... 505/230; 505/163; 505/232; 174/15.4; 174/125.1

(58) Field of Classification Search
USPC ......... 505/163, 230, 232, 884–888, 890, 897; 174/125.1, 15.4, 15.5
See application file for complete search history.

(56) References Cited

U.S. PATENT DOCUMENTS

| 7,358,435 B2 * | 4/2008 | Ladie' et al. .................. 174/15.4 |
| 2002/0153162 A1 * | 10/2002 | Spreafico .................... 174/125.1 |
| 2008/0194411 A1 * | 8/2008 | Folts et al. .................... 505/110 |

* cited by examiner

*Primary Examiner* — Stanley Silverman
*Assistant Examiner* — Kallambella Vijayakumar
(74) *Attorney, Agent, or Firm* — Sofer & Haroun, LLP

(57) ABSTRACT

A system is specified having at least one superconducting cable (SK) which has at least one superconducting conductor (2), and having a cryostat (KR) which surrounds the same and has two metallic tubes, an inner tube (6) and an outer tube (7), which are arranged concentrically at a distance from one another, are corrugated transversely with respect to their longitudinal direction and between which vacuum insulation (8) is arranged. The cable (SK) has a central tubular support (1) for passing a coolant through, on which the superconducting conductor (2) rests. The cable (SK) is surrounded all around by a buffer layer (5) which protects the same against mechanical damage and consists of insulating material, and the inner tube (6) of the cryostat (KR) at least rests in a sealed manner on the buffer layer (5).

1 Claim, 2 Drawing Sheets

US 8,670,808 B2

SYSTEM HAVING AT LEAST ONE SUPERCONDUCTING CABLE

RELATED APPLICATION

This application claims the benefit of priority from European Patent Application No. 09 306 039.0, filed on Oct. 30, 2009, the entirety of which is incorporated by reference.

BACKGROUND

1. Field of the Invention

The invention relates to a system having at least one superconducting cable which has at least one superconducting conductor, and having a cryostat which surrounds the same and consists of two metallic tubes, an inner tube and an outer tube, which are arranged concentrically at a distance from one another, are corrugated transversely with respect to their longitudinal direction and between which vacuum insulation is arranged (EP 1 720 176 B1).

2. Description of Related Art

With modern technology, a super conducting cable has electrical conductors composed of a composite material, which contains ceramic material, which changes to the superconducting state at sufficiently low temperatures. The electrical direct-current resistance of a correspondingly constructed conductor is zero when adequate cooling is provided, provided that a specific current level is not exceeded. By way of example, suitable ceramic materials are YBCO (yttrium barium copper oxide) or BSCCO (bismuth strontium calcium copper oxide). By way of example, sufficiently low temperatures to change a material such as this to the superconducting state are between 67 K and 110 K. Suitable coolants are, for example, nitrogen, helium, neon and hydrogen, or mixtures of these substances.

DE 601 29 172 T2 discloses a current transport system having a superconducting cable with a cold dielectric, which is arranged in a cryostat which consists of two tubes, which are arranged concentrically with respect to one another and are separated from one another by vacuum insulation. The cable has a superconducting conductor which is fitted on a tubular support, a dielectric surrounding the same, and a superconducting return conductor which is fitted over the same. It is arranged in the cryostat leaving a free space for a coolant to pass through, which coolant can also be passed through the tubular support. A system such as this has relatively high electrical alternating-current losses, as a result of which a relatively thick insulating dielectric is required, because of the increased electrical field strength. The dimensions of the cable, and accordingly also those of the cryostat, are correspondingly large.

In the system according to the initially cited EP 1 720 176 B1, a superconducting cable with a corrugated profile is arranged in a cryostat, which consists of two metallic tubes which are arranged concentrically with respect to one another and are corrugated transversely with respect to their longitudinal direction. Vacuum insulation is located between the tubes. The corrugated profile of the cable is ensured by a network which is attached to the same at specific points. The aim in this case is to compensate for the contraction of the cable which occurs when it cools down. In this system, the cryostat also surrounds not only the cable but also a cavity for a coolant to pass through, thus resulting in the same defects as in the system according to DE 601 29 172 T2.

OBJECTS AND SUMMARY

The invention is based on the object of developing the initially described system such that, on the one hand, it is possible to reduce the electrical alternating-current losses and, on the other hand, it is possible to reduce the electrical field strength in the dielectric.

This object is achieved according to the invention,
in that the cable has a central tubular support for passing a coolant through, on which the superconducting conductor rests,
in that the cable is surrounded all around by a buffer layer which protects the same against mechanical damage and consists of insulating material, and
in that the inner tube of the cryostat at least rests in a sealed manner on the buffer layer.

In this system, the inner conductor of the cryostat rests on the superconducting cable without any substantial free space and with the interposition of the buffer layer, as a result of which at least the radial dimensions of the cryostat can be reduced. This is further assisted by pushing the wave troughs of the inner conductor into the buffer layer. The coolant therefore flows virtually exclusively through the central tubular support, thus resulting in the superconducting conductor being cooled directly. This allows the temperature of the conductor to be monitored in a considerably better manner than in the case of a system with a cavity, which surrounds the cable, in the cryostat for the coolant to pass through. The alternating-current losses of the cable, and therefore the field strength in the dielectric, are likewise reduced, thus also making it possible to reduce the thickness of the dielectric. Overall, this results in a system with improved electrical characteristics and with smaller external dimensions.

In one preferred embodiment, the unit which consists of the inner tube of the cryostat and the superconducting cable and is closely connected is arranged with an excess length of about 0.3% in the outer tube of the cryostat. Because the corrugated inner tube is highly flexible and is mechanically robust at the same time, this can be achieved by deformation of the unit to a corrugated shape. This makes it possible to compensate in a simple manner for the contraction of the cable which occurs when it cools down.

BRIEF DESCRIPTION OF THE DRAWINGS

Exemplary embodiments of the subject matter of the invention are illustrated in the drawings, in which.

DETAILED DESCRIPTION

At least one superconducting cable is arranged in the cryostat and is surrounded by a buffer layer on which the inner tube of the cryostat rests. It would also be possible to accommodate more than one superconducting cable, for example three cables, in the cryostat, which are jointly surrounded by the buffer layer. A system with one superconducting cable is described in the following text, as being representative of all possible embodiments.

Figure 2:
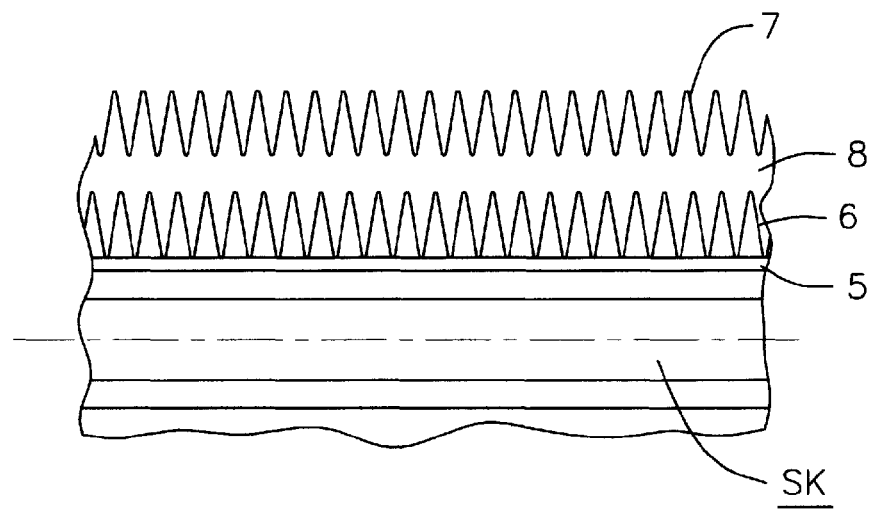
FIG. 2 shows a partial longitudinal section through the system shown in FIG. 1.
Figure 3:
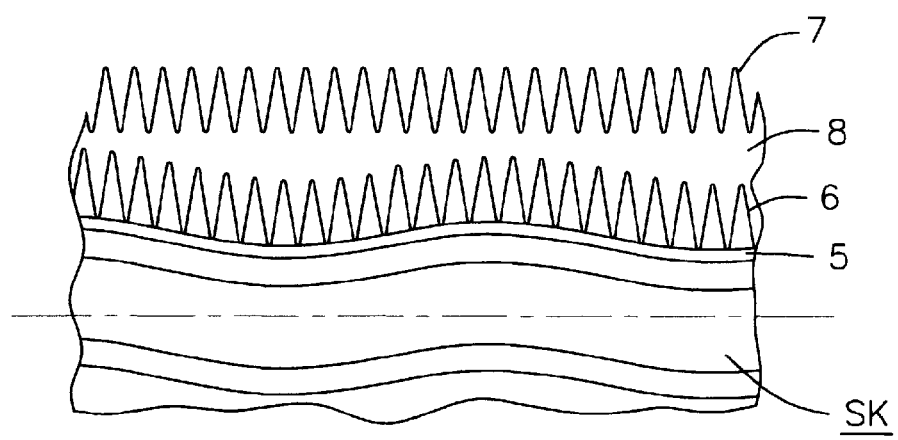
FIG. 3 shows an embodiment of the system, modified from that shown in FIG. 2.

FIGS. 2 and 3 show the superconducting cable only schematically, while the buffer layer and the inner tube, which surrounds it, of the cryostat are shown in more detail.

1 denotes a tube which is preferably composed of copper and may be in the form of a smooth tube, although it may also be corrugated transversely with respect to its longitudinal direction, in order to improve its flexibility. The tube 1 is used on the one hand as a tubular support for a superconducting cable SK, which consists of a superconducting conductor 2 arranged around the tube 1, a dielectric 3 surrounding the same and a screen 4, which is arranged over the same and is composed of superconducting material. It is used on the other hand for a coolant to pass through, by means of which the cable SK and its conductor 2 and its screen 4 are changed to the superconducting state.

The cable SK is surrounded by a buffer layer 5, which is used for mechanical protection and is composed of insulating material. This is advantageously composed of plastic, such as polytetrafluoroethylene or polyethylene and can be applied to the screen 4 by extrusion, for example, while the cable SK is being produced. However, the buffer layer 5 can also be produced by subsequently winding a strip of insulating material on to the screen 4. By way of example, this may have a wall thickness of between 2 mm and 10 mm.

Using a known technique, an inner tube 6 of a cryostat KR which surrounds the cable SK is formed around the buffer layer 5, and with this cryostat KR consisting of the inner tube 6 and an outer tube 7 which surrounds it at a distance. Vacuum insulation 8 is incorporated between the inner tube 6 and the outer tube 7. Both the inner tube 6 and the outer tube 7 are corrugated transversely with respect to their longitudinal direction. The corrugation may be annular or helical. The corrugation troughs, which face inwards, of the inner tube 6 at least rest in a sealed manner on the buffer layer 5. In one preferred embodiment, these corrugation troughs penetrate at least slightly into the buffer layer 5. If the inner tube 6 is helically corrugated, an intermediate space which runs in a helical shape remains between the inner tube 6 and the buffer layer 5, with variable unobstructed dimensions, through which coolant can likewise be passed.

Figure 1:
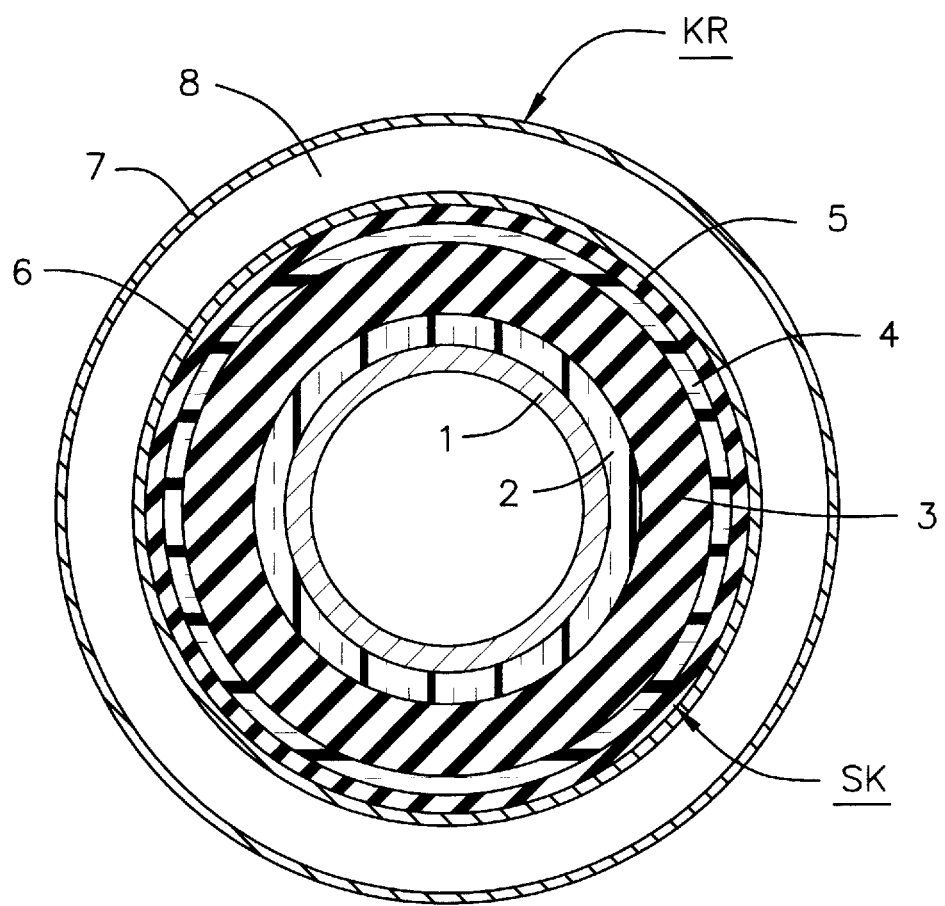
FIG. 1 shows a cross section through a system according to the invention.

In order to manufacture the system shown in FIGS. 1 and 2, the outer tube 7 is formed concentrically around the inner tube 6, with the interposition of spacers. The gap between the inner tube 6 and the outer tube 7 of the cryostat KR is finally evacuated, in order to produce the vacuum insulation 8.

In the preferred embodiment of the cable SK as shown in FIG. 3, the unit which consists of the cable SK with the buffer layer 5 and the inner tube 6 which closely surrounds it is first of all formed into a corrugated shape, as a result of which it has a length which is approximately 0.3% greater than when stretched in a straight line. Then, as described above, the outer tube 7 is formed at a distance around the unit which has been shaped in a corrugated shape, to be precise concentrically with respect to the neutral axis of the corrugated unit. The spacers which are used in this case are matched to the corrugated shape of the inner tube 6.

The invention claimed is:

1. System having at least one superconducting cable comprising:
   at least one superconducting conductor; and
   a cryostat which surrounds the superconducting conductor, said cryostat having two metallic tubes, an inner tube and an outer tube, which are arranged concentrically at a distance from one another, are corrugated transversely with respect to their longitudinal direction and between which vacuum insulation is arranged wherein
   the cable has a central tubular support for passing a coolant through, on which the superconducting conductor rests,
   the cable is surrounded all around by an insulating material buffer layer which protects the same against mechanical damage,
   wherein the corrugation of the inner tube of the cryostat which faces inwards, penetrates at least slightly into the buffer layer, and
   wherein the cable and the inner tube of the cryostat are in a wavelike form within the outer tube of cryostat such that for a given longitudinal distance, their linear lengths are approximately 0.3% greater than said longitudinal distance.

* * * * *